Figure 1:
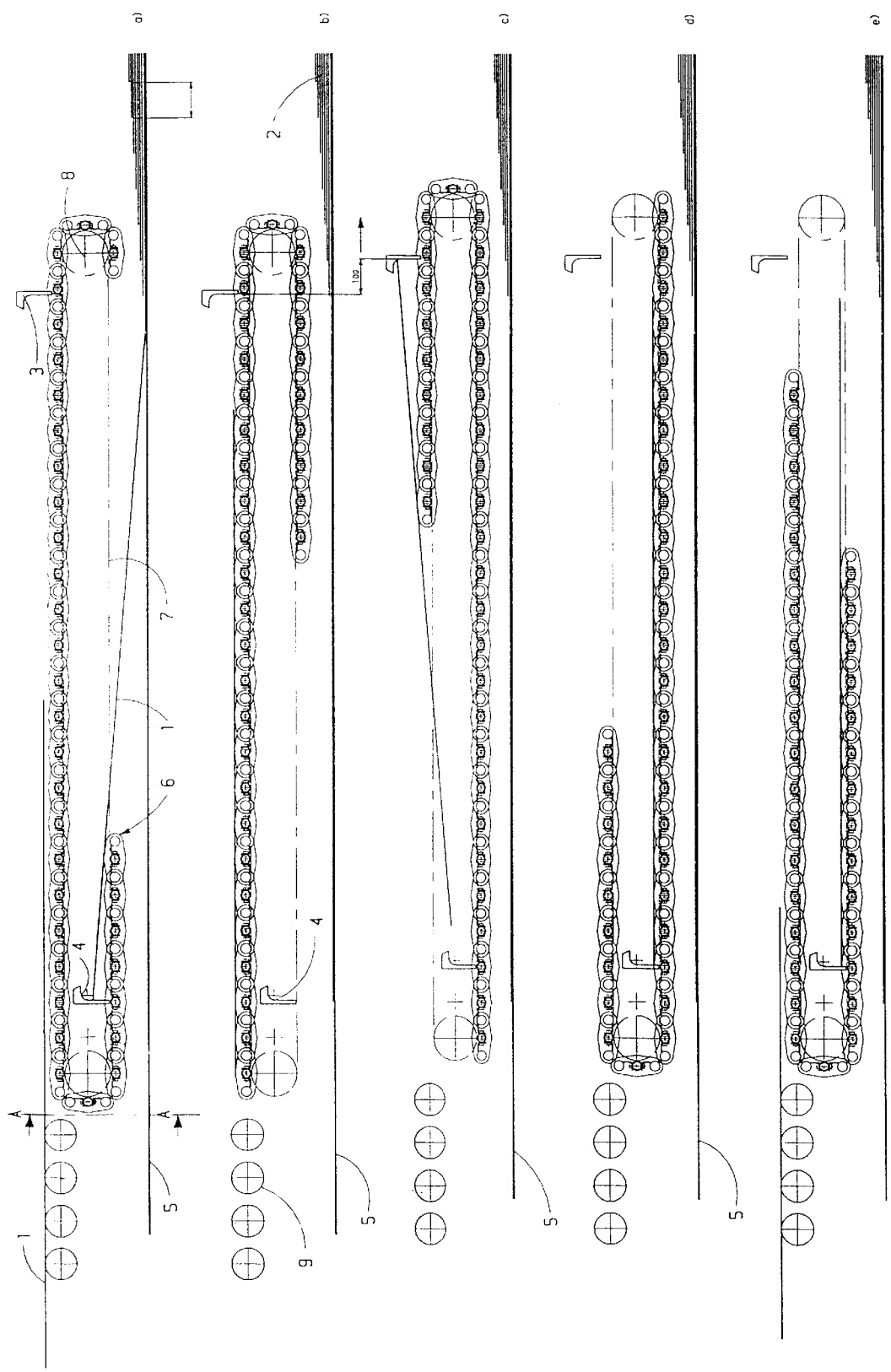

United States Patent [19]

Eerola

[11] Patent Number: 6,074,162

[45] Date of Patent: Jun. 13, 2000

[54] METHOD AND APPARATUS FOR LAYING A STACK OF WOOD VENEER SHEETS

[75] Inventor: Matti Eerola, Mankala, Finland

[73] Assignee: Raute Wood Oy, Mankala, Finland

[21] Appl. No.: 09/109,918

[22] Filed: Jul. 2, 1998

[51] Int. Cl.[7] .................................................. B65G 57/14
[52] U.S. Cl. .................................... 414/793.5; 414/791.5; 414/802
[58] Field of Search .............................. 414/793.4, 794.1; 802/793.5

[56] References Cited

U.S. PATENT DOCUMENTS

| | | | |
|---|---|---|---|
| 3,598,252 | 8/1971 | Billett et al. | 414/793.5 X |
| 3,807,553 | 4/1974 | Billett et al. | 414/793.5 X |
| 3,912,253 | 10/1975 | Jarman | 414/793.5 X |
| 4,159,108 | 6/1979 | Haft | 414/793.5 X |

Primary Examiner—Janice L. Krizek

Attorney, Agent, or Firm—Pollock, Vande Sande & Amernick

[57] ABSTRACT

The present invention relates to a method of forming a layup of wood veneer sheets and an apparatus suited for implementing the method. In the method, each of the sheets (1) is first taken separately into a forward-feed position on a level situated above the layup (2). Next, the sheet is lowered with its tailing edge first onto an intermediate platform located above the desired laying point in the layup, and further therefrom, the sheet is lowered with its leading edge first onto the layup. The apparatus includes a conveyor (6) arranged to run as an endless loop. The conveyor is adapted to perform a continuous loop travel during the entire cycle of the sheet-laying sequence. The conveyor bars supporting the sheet are omitted from a given section of the conveyor loop thus facilitating a stepwise lowering of the sheet onto the intermediate platform, and therefrom, further onto the layup. The alignment of the sheet is accomplished by means of a tailing edge stop (4).

3 Claims, 2 Drawing Sheets

METHOD AND APPARATUS FOR LAYING A STACK OF WOOD VENEER SHEETS

The present invention relates to a method of laying a stack of wood veneer sheets, and further, to an apparatus suited for implementing said method.

In the fabrication of a gluelam beam, the gluelam beam block is made by forming a stack from a plurality of single wood veneer sheets, coated by a glue layer, by way of successively laying the sheets onto each other according to a preset scheme. From such a layup, the actual gluelam beam is then finished by hotpressing, whereby the gluelam beam attains its final thickness and the glue bonding the wood veneers to each other is cured.

In a continuously-operating layup line, the laying is performed in successive stacks so that the end-to-end joints of wood veneers belonging to successive stacks are preferably located at staggered points in the superimposed wood layers in order to avoid an abrupt discontinuity in the joint between the ends of the successive sheet stacks.

As customary in the art, the layup is formed so that the wood sheet to be laid is moved by a laying conveyor, located above the layup, until the leading edge of the sheet hits a stop. The stop is positioned so as to stop the wood sheet in its intended laying position in which the sheet is lowered with its leading edge first meeting the layup when the delivery-type laying conveyor is reversed from below the sheet. However, this type of laying technique is hampered by a number of inaccuracy-causing weaknesses such as back-bouncing of the sheet from the stop. Obviously, the result is an imprecise positioning of the sheet in the layup, whereby an undesirable gap may remain between ends of the preceding sheet and the sheet being laid.

By virtue of the present invention, using otherwise a technical implementation chiefly based on the prior art, it is possible to achieve an accurate positioning of the sheet in the line direction of the layup through an arrangement in which, before being laid on the stack, the sheet is lowered with its tailing edge first onto an intermediate platform located above the layup position.

The method according to the invention can be implemented by means of an apparatus comprising an endless-loop conveyor with a width wider than the cut width of the sheet, the endless loop of said conveyor consisting of an essentially horizontal feed section longer than the sheet length and of a corresponding return section, and said conveyor being formed from two toothed belts or similar elements running in the line direction and from transverse bars or similar elements connecting said belts. According to the invention, the conveyor is arranged to perform a continuous loop motion during the entire laying step, the conveyor having its connecting bars or similar elements omitted from a section somewhat shorter than the length of the sheet being laid, and said apparatus including a sheet leading edge stop for stopping the sheet travel at the end part of the line-direction feed section of the feed conveyor and a sheet tailing edge stop for stopping the sheet travel at the end part of the return section of the feed conveyor, respectively.

Figure 2:
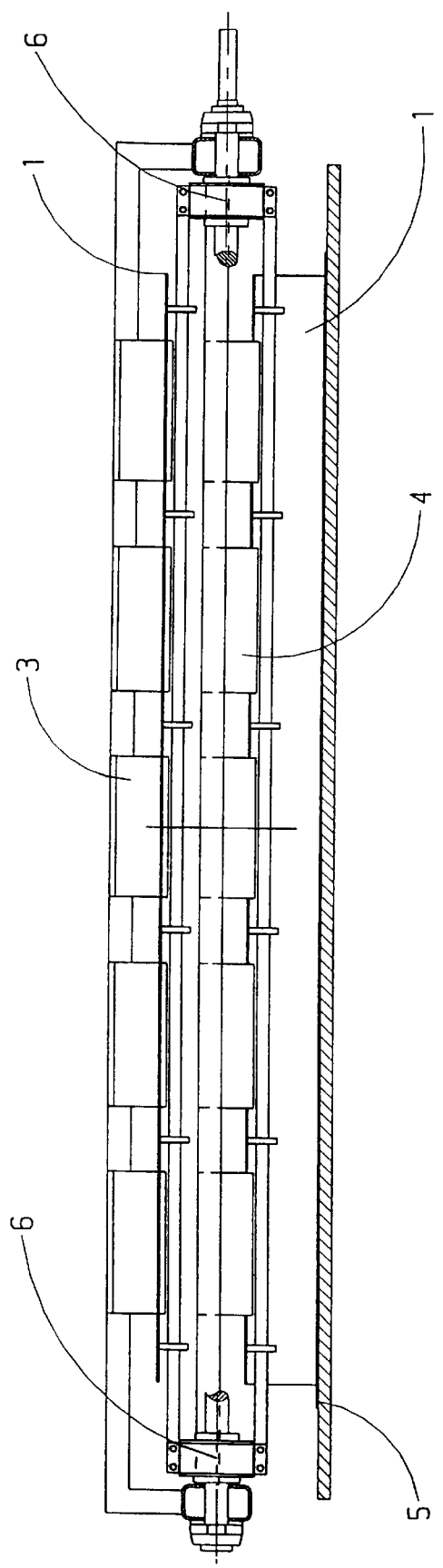

In the following, the invention is described in greater detail with reference to appended drawings in which FIG. 1 shows a sheet laying apparatus according to the invention in its different operating steps a–e, and FIG. 2 shows the cross section of the laying apparatus along plane A—A.

Referring to FIG. 1, the laying apparatus shown therein comprises a basically conventional, essentially horizontal feed conveyor 6 adapted to operate above a transfer conveyor 5 that supports the layup 2 to be formed and acts as a prime mover of said layup so as to run essentially parallel with said transfer conveyor. The basic structure of the feed conveyor includes two parallel-running, flexible conveyor means such as toothed belts 7. The belts are passed over two turning rolls 8 so as to form an endless loop. The belts 7 are spaced apart from each other at a distance greater than the width of the sheets 1 being laid. The turning rolls 8 are outdistanced from each other sufficiently apart to permit the sheet being laid to be driven onto the horizontal section of the feed conveyor 6 to be supported thereon.

For the support of the sheets, transverse support elements are provided between the parallel running belts. According to a characterizing specification of the invention, said transverse support elements are omitted from a section of the feed conveyor slightly shorter than the length of the sheets being laid on the layup. In FIG. 1, this feed conveyor section is drawn with dashed lines free from support elements. In addition to these elements, the desired function of the invention requires the apparatus to be complemented with a sheet leading edge stop 3 placed at the outgoing end of the apparatus and a sheet tailing edge stop 4 placed at the ingoing end of the apparatus, respectively. The sheet leading edge stop 3 is adapted on the upper section of the feed conveyor 6, while the sheet tailing edge stop is adapted inside the loop of the endless-belt feed conveyor, above the return section of the feed conveyor.

The function of the laying apparatus will be evident from steps (a)–(e) of FIG. 1. The transfer of the incoming sheet 1 onto the feed conveyor 6 must be synchronized so that a full-width-supporting section of the feed conveyor is introduced under the sheet over the entire travel of the sheet on the upper section of the feed conveyor when the sheet proceeds on the conveyor toward the sheet leading edge stop 3. The sheet leading edge stop is located approximately at the point where the sheet leading edge is intended to be situated in the final layup 2. As the leading edge of the sheet meets the stop 3, the feed conveyor 6 continues its feed motion, whereby continued forward travel of the open section of the conveyor from under the tailing end of the sheet permits the sheet rear edge to drop into the position shown in FIG. 1c. With the further continuing motion of the conveyor, also the sheet leading end is allowed to drop into the interior loop of the conveyor, onto the return section of the conveyor, into the position shown in FIG. 1d. In this situation, the continuing motion of the feed conveyor 6 pushes the sheet tailing edge against the sheet tailing edge stop 4.

The sheet tailing edge stop 4 is precision-positioned so that the leading edge of the precision-length-trimmed sheet 1 will be located accurately on the layup 2 being formed. Resultingly, the correct positioning of the sheet on the layup is achieved by continuing the feed motion of the conveyor 6, whereby the leading end of the sheet will be dropped on the layup as shown in the steps (e), (a) and (b) of FIG. 1. During this dropping step of the sheet, a new sheet to be laid can be fed onto the upper section of the conveyor 6 and the operation of the apparatus is continued through the steps described above. In order to obtain a stepwise staggered joint of the layup 2, the feed conveyor 6 must be transferred forward by the desired displacement distance of the successive sheet layer joints before the front end of the next sheet is lowered onto the layup.

For the optimal overall function of the apparatus according to the invention, it is advantageous to have the feed roller track 9, on which the sheets 1 arrive to the feed conveyor 6, to be comprised of rollers which are aligned at a small angle rather than being axially perpendicular to the feed direction. Then, if that side of the roller track toward which the rollers are adjusted to lead the sheet is provided with a suitable lateral guide aligned parallel to the line direction of the sheets, the roller track will push the sheets laterally so as to make them run along said guide, whereby the sheets will be forced to fall onto said layup with an accurate positioning of thus guided lateral edges of the sheets.

What is claimed is:

1. A method of forming a layup stack of wood veneer sheets, which comprises first taking each of the sheets separately into a forward-feed position on a level situated above the layup stack, in which position a leading edge of the sheet is aligned essentially at the desired laying point in the layup stack, wherein, when stopped in this position, the sheet is further lowered onto an intermediate level with a tailing edge of the sheet being first, the tailing edge is aligned with regard to the layup stack during the lowering, and the sheet is lowered further, keeping the tailing edge aligned, on the layup stack with its leading edge first.

2. An apparatus suitable for implementing the method defined in claim 1, said apparatus comprising an endless-loop feed conveyor (6) with a width wider than the cut width of the sheet (1), the endless loop of the feed conveyor comprising an essentially horizontal feed section longer than the sheet length and a corresponding return section and the feed conveyor being formed from two toothed belts (7) running in a line direction and from transverse bars connecting the belts, the feed conveyor being arranged to perform a continuous loop motion during the layup stack forming, and having connecting bars which are omitted from a section slightly shorter than the length of the sheet being laid, which apparatus further includes a sheet leading edge stop (3) for stopping the sheet travel at an end part of the feed section of the feed conveyor in the line direction, wherein the apparatus includes a sheet tailing edge stop (4) for stopping the sheet travel at an end part of the return section of the feed conveyor.

3. An apparatus as defined in claim 2, wherein the apparatus is arranged to move between each laying step by a preset distance in a sheet feed direction in order to obtain a staggered layup stack.

* * * * *